United States Patent
Nishiumi

(10) Patent No.: US 7,754,360 B2
(45) Date of Patent: Jul. 13, 2010

(54) FUEL CELL MODULE AND FUEL CELL MOTOR VEHICLE

(75) Inventor: Hiroaki Nishiumi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 28 days.

(21) Appl. No.: 12/190,976

(22) Filed: Aug. 13, 2008

(65) Prior Publication Data

US 2008/0302587 A1 Dec. 11, 2008

Related U.S. Application Data

(62) Division of application No. 10/160,174, filed on Jun. 4, 2002, now Pat. No. 7,427,447.

(30) Foreign Application Priority Data

Jun. 11, 2001 (JP) ............................. 2001-175673

(51) Int. Cl.
*H01M 8/00* (2006.01)
*H01M 8/04* (2006.01)
*B60K 1/00* (2006.01)

(52) U.S. Cl. .................. 429/12; 429/23; 180/65.31

(58) Field of Classification Search .................. 429/17, 429/22, 23, 12; 180/65.31
See application file for complete search history.

(56) References Cited

U.S. PATENT DOCUMENTS

| 5,767,584 | A | 6/1998 | Gore et al. |
| 5,858,568 | A * | 1/1999 | Hsu et al. ..................... 429/13 |
| 6,622,804 | B2 | 9/2003 | Schmitz et al. |
| 6,649,289 | B2 | 11/2003 | Hsu et al. |
| 2002/0172848 | A1 | 11/2002 | Ding |

FOREIGN PATENT DOCUMENTS

| JP | 57-188261 U | 11/1982 |
| JP | 2001-071753 | 3/2001 |
| WO | WO 97/33333 | 9/1977 |

OTHER PUBLICATIONS

Guidelines for Electric Vehicle Safety (SAE J2344 Jun 98).

* cited by examiner

*Primary Examiner*—Patrick Ryan
*Assistant Examiner*—Thomas H. Parsons
(74) *Attorney, Agent, or Firm*—Kenyon & Kenyon LLP

(57) ABSTRACT

A fuel cell module has a fuel cell that supplies a drive power to a vehicle, a case that covers the fuel cell, and a current breaker that is attached to the case. The current breaker is manually operable from outside the case, and is capable of interrupting an output of the fuel cell to outside the case. The current breaker interrupts current at the time of a manual operation, thereby securing safety from high voltage of the fuel cell module during a vehicle maintenance operation and the like.

10 Claims, 3 Drawing Sheets

FUEL CELL MODULE AND FUEL CELL MOTOR VEHICLE

INCORPORATION BY REFERENCE

This is a division of application number 10/160,174 filed 4 Jun. 2002, which claims priority to Japanese Application No. 2001-175673 filed 11 Jun. 2001, the contents of which are incorporated herein by reference in their entirety.

BACKGROUND OF THE INVENTION

1. Field of the Invention

The invention relates to a fuel cell module and a fuel cell motor vehicle equipped with the fuel cell module. More particularly, the invention relates to a technology for ensuring safety at the time of maintenance of the vehicle or the like by shutting off the output of electric current from the fuel cell module.

2. Description of the Related Art

In recent years, motor vehicles employing fuel cells as a drive energy source have drawn attention, and have been produced as prototypes as an approach to solving environmental issues. An example of such motor vehicles is a fuel cell motor vehicle in which a fuel cell is installed at a site near a center of the vehicle, such as a space below a seat, taking into consideration the weight balance of the vehicle, the installation space, etc. Lately, installation of a fuel cell in a forward portion of a vehicle is considered. The development of fuel cell motor vehicles is now at a stage where near-future widespread commercialization is aimed and expected.

A fuel cell capable of driving a vehicle produces relatively high voltage. Therefore, during maintenance of the vehicle or the like, output of voltage from the fuel cell module, if any, is undesired in terms of safety. Furthermore, since cooling water is circulated between the fuel cell module and a radiator, and is delivered into the interior of the fuel cell, an intermediate electric potential between the potential of the positive electrode and the potential of the negative electrode of the fuel cell may occur in the cooling water. That is, due to the cooling water, the intermediate electric potential is extracted out of the fuel cell module. That is, the fuel cell has a characteristic that high voltage can occur between the cooling water and the positive electrode, and between the cooling water and the negative electrode. This characteristic of the fuel cells is not considered in the conventional safety measures against electricity leakage and the like. There is another problem of an insufficient safety measure against electricity leakage and the like in the case of breakage of a fuel cell module caused at the time of a collision of the vehicle with an object.

SUMMARY OF THE INVENTION

Accordingly, it is an object of the invention to provide a fuel cell module and a fuel cell motor vehicle capable of ensuring safety from high voltage output of a fuel cell at the time of a maintenance operation and the like.

The invention provides a fuel cell module including a fuel cell that supplies a drive electric power to a vehicle, a case that covers the fuel cell, and a current breaker that is attached to the case, and that is manually operable from outside the case, and that is capable of interrupting an output of the fuel cell to outside the case.

In this fuel cell module, the fuel cell is covered by the case. The case may entirely enclose the fuel cell, or may partially shield the fuel cell from an outside environment, at a portion of the solid angle that faces the fuel cell. The output terminals of the fuel cell are connected to a motor, a circuit and the like that are disposed in a space outside the case, via the current breaker. The output terminals of the fuel cell and the current breaker are interconnected without wiring extending in the space outside the case. Therefore, when the current breaker is put into a disconnected state, a portion to which output voltage of the fuel cell is applied does not exist in an external space that is shielded from the fuel cell by the case, so that leakage of current from the fuel cell to the space outside the case is prevented in a good manner.

According to a further aspect of the invention, there is provided a fuel cell motor vehicle equipped with the above-described fuel cell module. In this fuel cell motor vehicle, the fuel cell module is installed in a forward portion of the vehicle, and the current breaker is disposed in a side surface of the fuel cell module which faces in a transverse direction of the vehicle. In a preferred fuel cell motor vehicle, the current breaker may be disposed at a position in the side surface which is toward a rear of the vehicle.

If a vehicle collides with an object during a run of the vehicle, it is often the case that the vehicle collides with an object present forward of the vehicle. In such a collision, a forward portion of the vehicle receives a great impact in a longitudinal direction with respect to the vehicle, so that front and rear surfaces of the fuel cell module strike adjacent portions of the vehicle, and can therefore receive great pressures.

In the fuel cell motor vehicle, the current breaker is disposed at a position in the side surface which is toward a rear of the vehicle. At this position, there is a relatively small possibility of the current breaker striking adjacent portions of the vehicle. Should the current breaker strike an adjacent portion of the vehicle, only a relatively weak impact will occur, so that the danger of breakage of the current breaker is small. Therefore, even after a collision, the function of the current breaker is retained, so that safety against high voltage can be secured at the time of repair or the like. In particular, if the current breaker is disposed in a side surface of the fuel cell module which is toward the rear of the vehicle, breakage of the current breaker can be avoided in the case of a collision where a forward portion of the vehicle is crushed.

BRIEF DESCRIPTION OF THE DRAWINGS

The above mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF PREFERRED EMBODIMENTS

In the following description and the accompanying drawings, the present invention will be described in more detail in terms of preferred embodiments.

Figure 1:
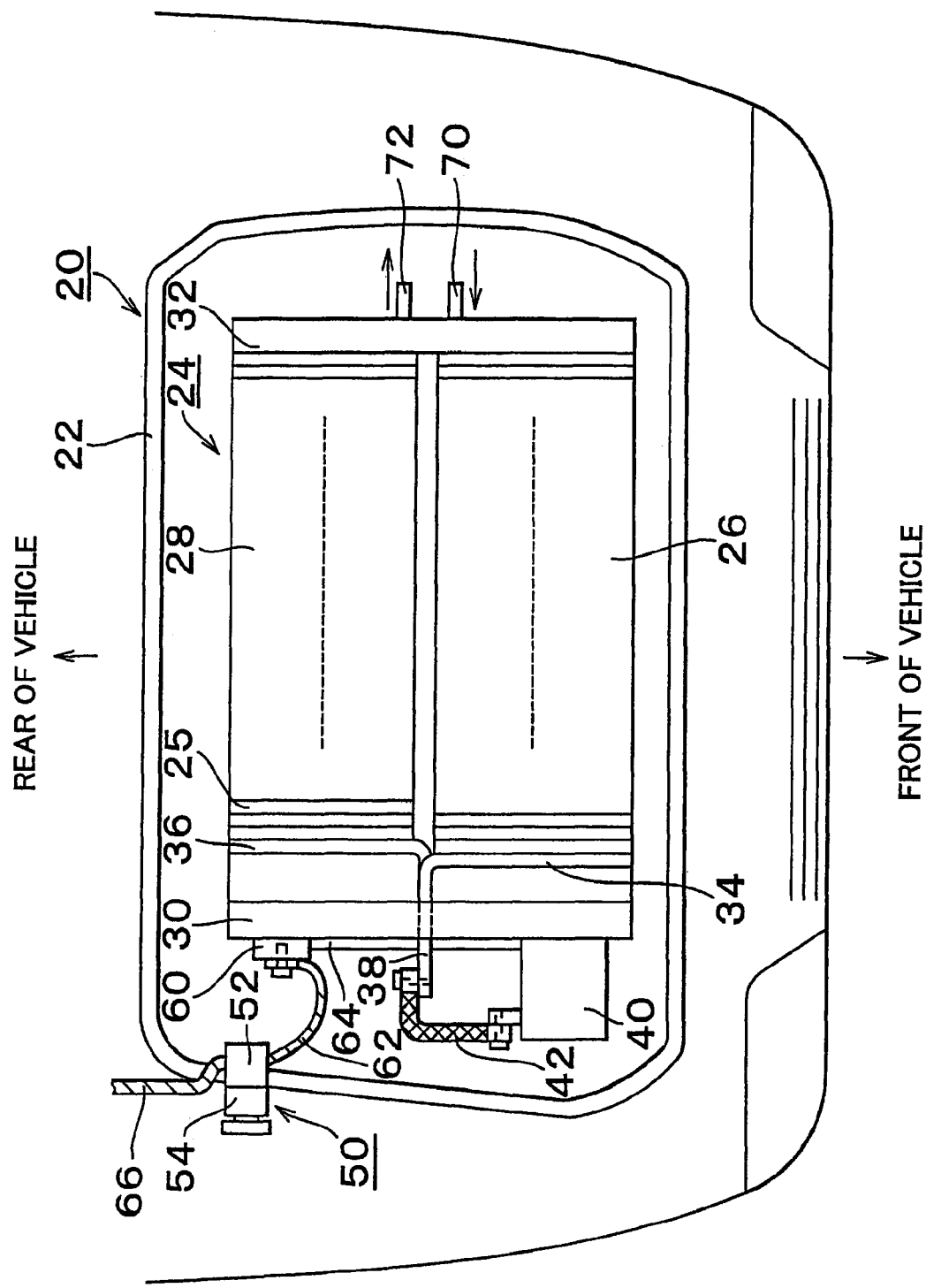
FIG. 1 is a schematic top plan view of a forward portion of a fuel cell motor vehicle equipped with an exemplary fuel cell module in accordance with an embodiment of the invention.

FIG. 1 is a schematic top plan view of a forward portion of a fuel cell motor vehicle equipped with a fuel cell module in accordance with an embodiment of the invention. In FIG. 1, a fuel cell module 20 is disposed in an engine room formed in a forward portion of the vehicle. The fuel cell module 20 has a fuel cell stack 24 that is contained in a fuel cell stack case 22 (hereinafter, simply referred to as "case 22"). Although the case 22 tightly encloses the fuel cell stack 24 in reality, an upper surface of the case 22 is removed in FIG. 1 to show the structure of the fuel cell stack 24 and the like provided in the case 22 for the sake of illustration.

The fuel cell stack 24 is formed by a first stack 26 and a second stack 28 disposed in parallel. Each of the first stack 26 and the second stack 28 is formed by stacking platy unit cells 25. The stacks 26, 28 have equal numbers of unit cells, and are designed to produce equal voltages. The stacking direction of both the first stack 26 and the second stack 28 is a left-right direction with respect to the vehicle. The stacks 26, 28 are clamped in the stacking direction by metallic end plates 30, 32 disposed on the right and left side ends of the stacks. The end plates 30, 32 have a relatively great thickness (of, e.g., about 15 mm). The polarity of the unit cells disposed in the stack 26 is opposite to the polarity of the unit cells of the stack 28. For example, the positive pole of the stack 26 is on the left side, and the negative pole thereof is on the right side in FIG. 1. In the stack 28, the positive pole is on the right side and the negative pole thereof is on the left side. End portions of the stack 26 and the stack 28 on the end plate 32 side are electrically interconnected, so that the two stacks 26, 28 form a body of unit cells connected in series which produces a desired high voltage.

End portions of the stack 26 and the stack 28 on the end plate 30 side are provided with end electrodes 34, 36 of the in-series connected unit cell body formed by the stacks 26, 28. For example, according to the aforementioned direction of arraying the unit cells, the electrode 34 stacked on the stack 26 is the positive pole, and the electrode 36 stacked on the stack 28 is the negative pole. The electrodes 34, 36 are bent in the stacking direction at a border between the stack 26 and the stack 28 (that is, a middle portion of the fuel cell stack 24 with respect to a longitudinal direction of the vehicle), and therefore have a letter-L shape. The portion of each electrode 34, 36 bent in the stacking direction extends through a hole formed in a central portion of the end plate 30 with respect to the vehicle longitudinal direction, and protrudes from the end plate 30 toward a side of the vehicle. The protruded portions of the electrodes 34, 36 are used as terminals 38.

The end plates 30, 32 are fixed to the case 22. The stacks 26, 28 undergo dimensional changes in the stacking direction due to thermal expansion and contraction and the like. Therefore, coned disc spring stacks (not shown) are disposed between the end plate 30 and the electrode 34 and between the end plate 30 and the electrode 36 so that the unit cells of the stacks 26, 28 are constantly pressed against each other by a suitable force.

The end plate 30 is provided with a relay 40, an electric circuit and a distributor (not shown). The relay 40 is electrically connected to the positive-pole terminal 38 and the negative-pole terminal 38 via a bus bar (hereinafter, referred to as "flexible bus bar") 42. The flexible bus bar 42 is bolted to the relay 40 and the terminals 38.

A service plug 50 is attached to a side surface toward a side to the vehicle (the end plate 30—side surface) of the case 22, at a position toward the rear of the vehicle. The service plug 50 is made up of a fixed part 52 fixed to the case 22, and a plug part 54 that is provided outside the case 22 and is removable from the fixed part 52. A terminal support 60 is provided on the end plate 30, at a position near the service plug 50. The terminal support 60 serves as a junction to electrically connect the relay 40 and the fixed part 52 of the service plug 50. That is, a harness 62 connected to the fixed part 52 and a bus bar 64 connected to the relay 40 are electrically interconnected at the terminal support 60. Thus, the relay 40 and the fixed part 52 of the service plug 50 are electrically connected separately for the positive pole and the negative pole.

A power output cable 66 is led from the fixed part 52 of service plug 50 to the outside of the case 22. The power output cable 66 and the harness 62 connected to the fixed part 52 are electrically connected by the plug part 54.

In the above-described construction, electric power generated by the fuel cell module 20 is output via the relay 40, the service plug 50 and the power output cable 66. The output can be interrupted by the relay 40 and the service plug 50. The relay 40 electrically disconnects the connecting terminals to the flexible bus bar 42 and the connecting terminals to the bus bar 64 with respect to the positive pole and the negative pole in accordance with a control signal from an external device. For example, during a normal state, such as a run of the vehicle or the like, the relay 40 is held in an on-state to allow output from the fuel cell module 20. In accordance with the control signal output, for example, in a case where a collision sensor (not shown) detects a collision of the vehicle, the relay 40 is switched to an off-state to interrupt output from the fuel cell module 20.

The service plug 50 allows output from the fuel cell module 20 during a state where the plug part 54 is coupled to the fixed part 52. However, when the plug part 54 is pulled off of the fixed part 52, the power output cable 66 and the harness 62 are electrically disconnected. This disconnection is accomplished inside the case 22, and there exists no site or portion to which an output voltage of the fuel cell stack 24 is applied. Thus, the service plug 50 serves as a current breaker that can be manually operated from outside the case 22. For example, at the time of maintenance, safety from high voltage of the fuel cell module 20 can be ensured if a serviceperson changes the service plug 50 into the disconnected state.

A piping is provided between the fuel cell module 20 and a radiator (not shown) for circulation of cooling water. Cooling water, after being cooled by the radiator, flows into the fuel cell stack 24 via an inlet 70, and passes through gap spaces formed in the fuel cell stack 24, thereby receiving heat produced by combustion of hydrogen. Then, cooling water flows out via an outlet 72, and is returned to the radiator. Since the cooling water contacts the electrodes of the unit cells while flowing in the fuel cell stack 24, the cooling water is affected by the electric potentials of the electrodes, and therefore has electric potential that is between the positive potential (+V) of the electrode 34 and the negative pole (−V) of the electrode 36. For example, if the inlet 70 and the outlet 72 are formed in the end plate 32, the cooling water basically has an electric potential present near the end plate 32 (an approximately zero potential).

Figure 2:
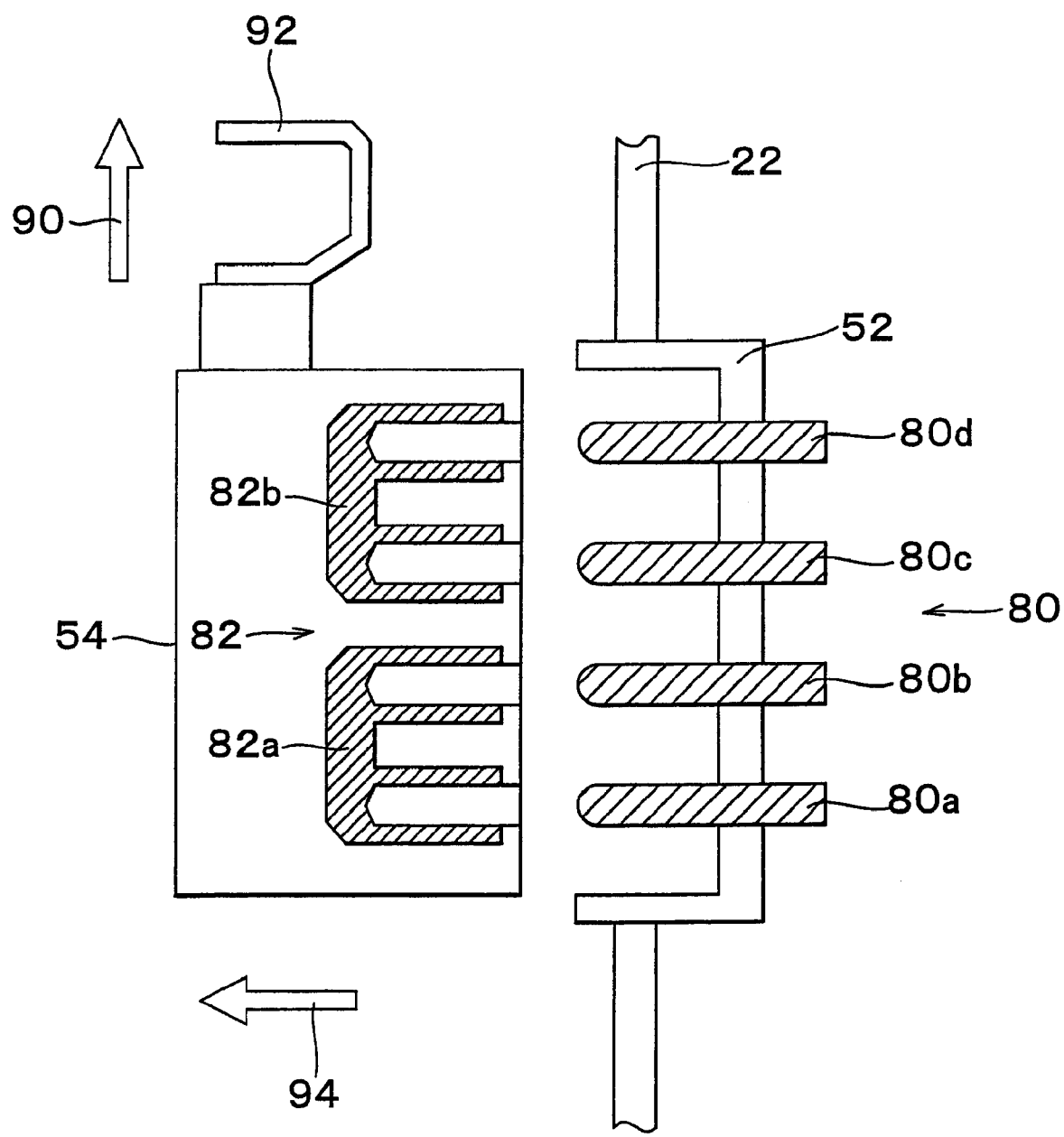
FIG. 2 is a schematic longitudinal sectional view of a service plug in accordance with the embodiment of the invention.

The service plug 50 will be further described below. FIG. 2 is a schematic longitudinal sectional view of the service plug 50. The fixed part 52 attached to the case 22 has four male terminals 80 that are arranged, for example, in a longitudinal line. These male terminals 80 form two pairs of terminals corresponding to the positive and negative poles. For example, male terminals 80a, 80b correspond to the positive poles. The male terminal 80a is connected to the harness 62, and the male terminal 80b is connected to the power output cable 66. The female terminals 80c, 80d correspond to the negative pole. The male terminal 80c and the male terminal 80d are connected to the harness 62 and the power output cable 66, respectively. The plug part 54 has female terminals 82 that electrically connect the two pairs of male terminals 80 separately. When the plug part 54 is fitted to the fixed part 52, the male terminals 80*a*, 80*b* are electrically connected by the female terminal 82*a*, and the male terminals 80*c*, 80*d* are electrically connected by the female terminal 82*b*. When the plug part 54 is pulled off from the fixed part 52 as shown in FIG. 2, the male terminals 80*a*, 80*b* are electrically disconnected, and the male terminals 80*c*, 80*d* are electrically disconnected.

Figure 3:
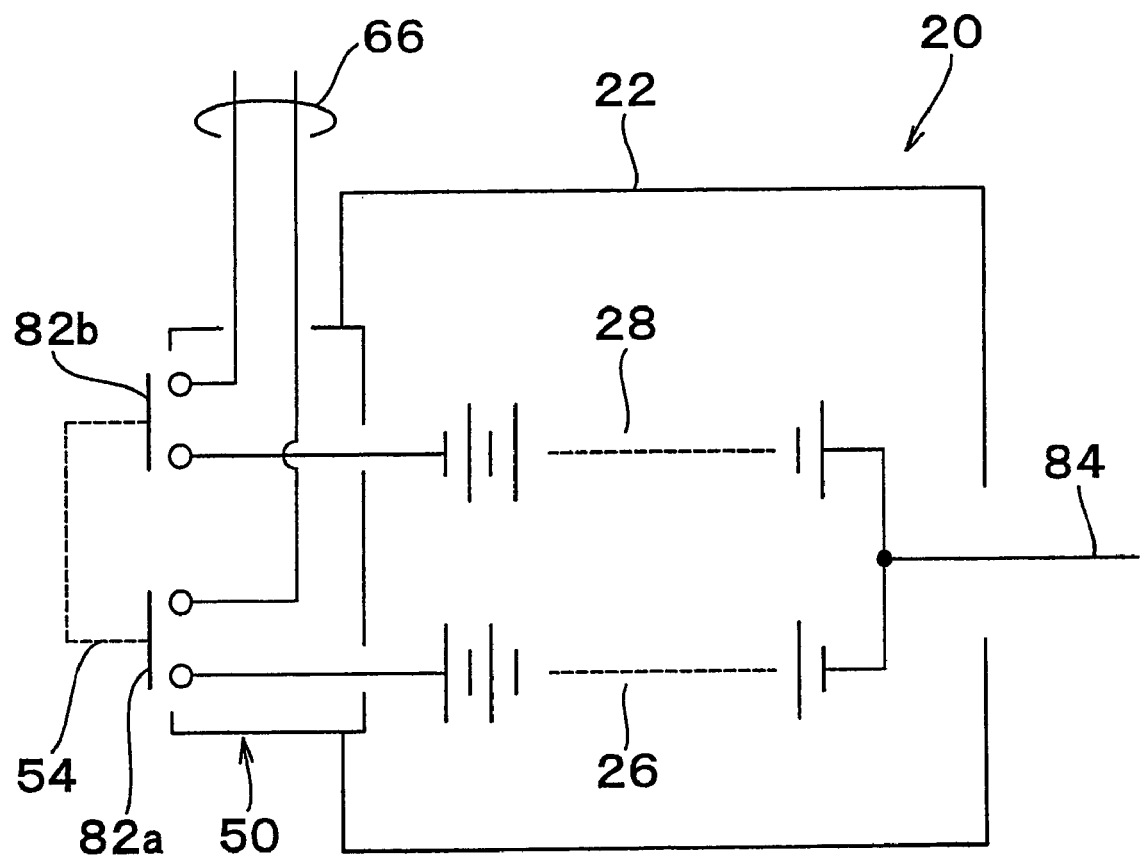
FIG. 3 is a simplified circuit diagram of a fuel cell module illustrating a function of the service plug in accordance with the embodiment of the invention.

FIG. 3 is a simplified circuit diagram of the fuel cell module 20 for illustrating functions of the service plug 50. This circuit diagram shows the stacks of unit cells and the service plug 50, but does not show other circuit elements such as the relay 40 and the like. Removing the service plug 50 from the plug part 54 simultaneously breaks the electrical connection between the positive pole of the fuel cell stack 24 and the outside of the case 22 and the electrical connection between the negative pole of the fuel cell stack 24 and the outside of the case 22. An intermediate electric potential given to the cooling water is extracted from the fuel cell module 20 to the outside of the case 22 (as indicated by a terminal 84 in FIG. 3).

If the service plug is designed to disconnect only one of the pole lines, for example, only the positive pole-side line, no current flows through a circuit connecting the positive side and the negative side of the power output cable 66. In that case, however, current can flow between the negative pole and the cooling water indicated by the terminal 84. That is, if a circuit is formed between the negative pole side of the power output cable 66 and the cooling water, there is a possibility of leakage current. Such an undesired event is prevented in the fuel cell module 20 in this embodiment because the service plug 50 disconnects the two poles.

To remove the service plug 50, a serviceperson raises a handle 92 provided in an upper portion of the plug part 54 as indicated by an arrow 90 in FIG. 2. The plug part 54 has a built-in mechanism that moves the female terminal 82 horizontally (in a direction indicated by an arrow 94) in association with the rising action of the handle 92. Since the service plug 50 is attached to a side surface of the fuel cell module 20 as described above, a serviceperson conventionally must perform actions of inserting a service person's hand to sides of the plug part 54 and then pulling the plug part 54 horizontally. However, since various devices are disposed in the engine room, it is not easy to secure a space for inserting a hand. Furthermore, the action of pulling the plug part 54 horizontally with a hand inserted from above does not easily produce a sufficient force on the plug part 54. To eliminate these difficulties and facilitate the breakage of current, the handle 92 is provided in an upper portion of the plug part 54, and a construction is provided such that raising the handle 92 will remove the plug part 54 from the fixed part 52. It should be noted herein that if the serviceperson pulls the handle 92, the female terminal 82*a* and the female terminal 82*b* are simultaneously pulled off. That is, the positive pole-side connection and the negative pole-side connection are simultaneously broken by a single action, thereby avoiding an event that one of the pole connections is left unbroken due to an operation error made by a serviceperson.

Although in the above-described construction, the case 22 covers the entire fuel cell stack 24, it is also possible to provide a case that partially covers the fuel cell stack 24. For example, the case 22 may be a case that mainly covers a portion that would be exposed to view when the engine hood is opened, that is, a case that covers an upper surface of the fuel cell stack 24 or an upper surface and side surfaces thereof, and has an opening in the bottom.

It is also possible to adopt a construction in which the service plug 50 is connected and disconnected in association with the opening and closing of the case 22. Examples of the construction are a construction in which the case 22 can be opened only after the service plug 50 is put into a disconnected state, a construction in which the service plug 50 enters a disconnected state in association with an action of opening the case 22, etc. The above-described construction achieves an improvement in the safety from high voltage generated by the fuel cell stack 24, for example, in the case where a serviceperson opens the case 22 for maintenance of the fuel cell module 20, or the like.

According to the fuel cell module of the invention, output to the outside of the fuel cell can be prevented by the current breaker that is manually operable from outside. Therefore, safety in a maintenance operation and the like can be secured. Furthermore, the simultaneous disconnection of both the positive pole and the negative pole prevents leakage current between the potential of the positive pole and the intermediate potential given to the cooling water and leakage current between the intermediate potential and the potential of the negative pole, so that safety during a service operation and the like is ensured. Still further, since the manually operable current breaker is disposed on a side surface of the case which faces in the transverse direction of the vehicle (in particular, at a rearward site on such a side surface), the possibility of breakage of the current breaker at the time of a collision is reduced, and the function of the current breaker is secured. Therefore, safety during a maintenance operation and the like after a collision is attained.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel cell module comprising:
   a fuel cell that supplies a drive electric power to a vehicle;
   a first conductor that connects to a load;
   a second conductor that connects to the fuel cell; and
   a current breaker, wherein the current breaker is manually operable and is capable of simultaneously interrupting an output from a positive pole of the fuel cell and an output from a negative pole of the fuel cell,
   wherein the current breaker includes:
   a first terminal that connects to the first conductor;
   a second terminal that connects to the second conductor; and
   a third terminal that mates with both the first and second terminals, and is able to connect and disconnect the first and second terminals.

2. The fuel cell module according to claim 1, wherein the current breaker further includes a handle, pulling of the handle in a first direction causes the first and second terminals to disconnect from the first and second conductors in a second direction.

3. The fuel cell module according to claim 1, wherein cooling water circulates in the fuel cell module and an intermediate electric potential given to the cooling water is extracted from the fuel cell module.

4. The fuel cell module according to claim 1, wherein a plurality of terminals of a fixed portion of the current breaker are disposed along a line.

5. The fuel cell module according to claim 1, further comprising: a relay that is located between the current breaker and the fuel cell.

6. The fuel cell module according to claim 1, wherein the stacking direction of stacks of the fuel cell is a right-left direction of the vehicle.

7. A fuel cell motor vehicle equipped with the fuel cell module of claim 1,
wherein the fuel cell module is installed in a forward portion of the vehicle, and
wherein the current breaker is disposed in a side surface of the fuel cell module which faces in a transverse direction of the vehicle.

8. The fuel cell motor vehicle according to claim 7, wherein the current breaker is disposed at a position in the side surface which is toward a rear of the vehicle.

9. A fuel cell motor vehicle equipped with the fuel cell module of claim 1, wherein a coolant circulates in a circuit that includes the fuel cell and a body external to the fuel cell.

10. The fuel cell motor vehicle of claim 9, wherein the body is a radiator.

* * * * *